United States Patent [19]

Lanham

[11] Patent Number: 5,010,808
[45] Date of Patent: Apr. 30, 1991

[54] SPIRAL CONVEYOR OVEN

[75] Inventor: William E. Lanham, Conyers, Ga.

[73] Assignee: APV Baker Inc., Atlanta, Ga.

[21] Appl. No.: 590,173

[22] Filed: Sep. 28, 1990

Related U.S. Application Data

[63] Continuation-in-part of Ser. No. 468,756, Jan. 23, 1990, Pat. No.

[51] Int. Cl.⁵ .................. A23L 3/02; F27B 9/00; F27B 9/16; B65G 21/18
[52] U.S. Cl. .................. 99/443 C; 34/147; 34/207; 99/365; 99/478; 198/778; 432/121
[58] Field of Search ............... 99/365, 443 R, 443 C, 99/447–479; 432/11, 121, 133; 198/778, 831; 34/207, 147; 126/21 A

[56] References Cited

U.S. PATENT DOCUMENTS

| | | | |
|---|---|---|---|
| 1,445,196 | 2/1923 | Berry | 99/365 |
| 1,837,502 | 12/1931 | Thompson | 99/365 |
| 3,348,659 | 10/1967 | Roinestad | 34/147 X |
| 3,536,183 | 10/1970 | Locke | 198/778 |
| 3,666,083 | 5/1972 | Smith | 198/778 |
| 3,680,493 | 8/1972 | Lanham et al. | 34/147 X |
| 3,865,227 | 2/1975 | Kaak | 198/778 X |
| 4,201,288 | 5/1980 | van Capelleveen | 198/778 |
| 4,514,167 | 4/1985 | Royer | 99/443 C |
| 4,544,352 | 10/1985 | Lanham et al. | 34/207 |
| 4,608,961 | 9/1986 | Lanham, Jr. et al. | 126/21 A |
| 4,636,366 | 1/1987 | Langen | 99/362 |
| 4,726,766 | 2/1988 | Stewart et al. | 99/443 C |
| 4,792,303 | 12/1988 | Stewart et al. | 432/133 |

Primary Examiner—Timothy F. Simone
Attorney, Agent, or Firm—Pasquale A. Razzano

[57] ABSTRACT

A bakery oven is disclosed which includes an oven enclosure having opposed end and side portions, with conveyor inlet and outlet openings formed therein. An endless center drive chain conveyor is provided which includes a first section located outside of the enclosure with portions thereof passing through the inlet and outlet openings. The conveyor includes a second main portion located within the enclosure which follows a generally spiral path of travel including a first sequential set of spiral flights having a generally continuously increasing elevation rising in the enclosure to a predetermined elevation, a second set of spiral flights having a generally continuously decreasing elevation in the enclosure, with the flights of said second set being located between the flights of the first set. A straight conveyor section connects the first and second flights at the uppermost elevations of the first and second sets of flights and crosses from one side of the enclosure to the other, whereby the position of pans on the conveyor relative to the sides of the conveyor are reversed during travel in the riser and declining sections of the conveyor. The drive for the conveyor is located outside of the oven to be protected from the heat in the oven.

19 Claims, 6 Drawing Sheets

SPIRAL CONVEYOR OVEN

This application is a continuation-in-part of U.S. patent application Ser. No. 468,756, filed Jan. 23, 1990, now U.S. Pat. No. 4,997,365, the disclosure of which is incorporated herein by reference.

The present invention relates to commercial bakery ovens, and more particularly to an improved conveyor arrangement for handling bakery products.

BACKGROUND OF THE INVENTION

In modern bakery operations, conveyorized ovens are utilized for baking bread and other dough products in order to transport the bakery products through the oven, and other components of the bakery, on a continuous basis to produce the bakery product. The conveyor may be one single continuous conveyor extending through all of the bakery operations, or it can be a series of conveyors within each separate operation, with an intermediate conveyor for transferring pans from one operation to another. For example, there may be a single continuous conveyor for the oven and another single separate conveyor for the proofer.

In previously proposed bakery operations the conveyors, particularly in an oven, have taken a variety of forms. For example, it has previously been proposed to provide circular conveyors, as well as spiral conveyors. Typically, these conveyors extend along the periphery of the interior oven space through several flights in a circular or generally rectangular path of travel. Such conveyors are disclosed, for example, in U.S. Pat. Nos. 3,680,493; 4,726,766; and 4,514,167. As seen in these patents, such ovens require a substantial amount of space with a substantial portion of the interior of the oven vacant, since the conveyor primarily resides along the periphery of the oven.

In U.S. Pat. No. 4,726,766, the conveyor follows an interior and exterior spiral path, which utilizes the interior space of the oven more completely, but which is complex to construct.

All bakery ovens contain very high temperature and humidity atmospheric conditions which are harmful to equipment exposed to such conditions for extended periods of time. Thus, such conveyor systems are subject to unusual conditions and are difficult to maintain. At the same time it is desirable for bakery operators that their ovens operate continuously over long periods of time while producing consistently uniform bakery products.

It is an object of the present invention to provide an improved conveyor system for bakery ovens.

Another object of the present invention is to provide an improved bakery oven conveyor and conveyor system.

A further object of the present invention is to provide a conveyor system of the type described herein which is efficient and dependable in operation.

Yet another object of the present invention is to provide an improved conveyor system for bakery products which avoids the drawbacks of the prior art.

Another object of the present invention is to provide a bakery oven construction in which the bakery products are subjected to substantially uniform baking conditions in the course of their journey through the oven.

SUMMARY OF THE INVENTION

The present invention involves a unique conveyor system for transporting bakery pans or the like through a bakery oven. In one embodiment of the invention the conveyor is adapted to enter and exit the oven enclosure through inlet and outlet openings which are located at the same height and at the same side of the enclosure.

The conveyor system of the present invention follows a generally spiral path within the oven but defines at least one crossover in its path of travel within the oven. One set of flights of the conveyor leading from the inlet port follow a generally continuously rising path of travel to a predetermined height and then crosses over to the opposite side of the oven to a second set of flights, which follow a generally descending path of travel. The ascending and descending flights are alternated between one another. When the conveyor reaches its lowermost position in the descending flights it passes to the outlet opening in the oven housing.

By this construction, all of the bread pans pass through the entire oven and are all subjected to the same conditions throughout the oven. In particular, the pans follow essentially the same path of travel in the rising section of the oven as in the descending section of the oven, but their position in the two sections relative to each other is changed by 180°, thus assuring a more uniform bake to occur for the products on the tray.

This construction is used with a very open type of conveyor having a center drive chain with wire supporting grids thereon that permits free passage of heat around the bakery products. This conveyor system permits the drive for the center chain to be located outside of the conveyor away from the hostile environment in the oven so that it is protected from heat and humidity and will have a longer operable life.

The above, and other objects, features and advantages of this invention will be more fully understood from the ensuing detailed description of a preferred embodiment thereof which is to be read in connection with the accompanying drawings, wherein:

Figure 1:
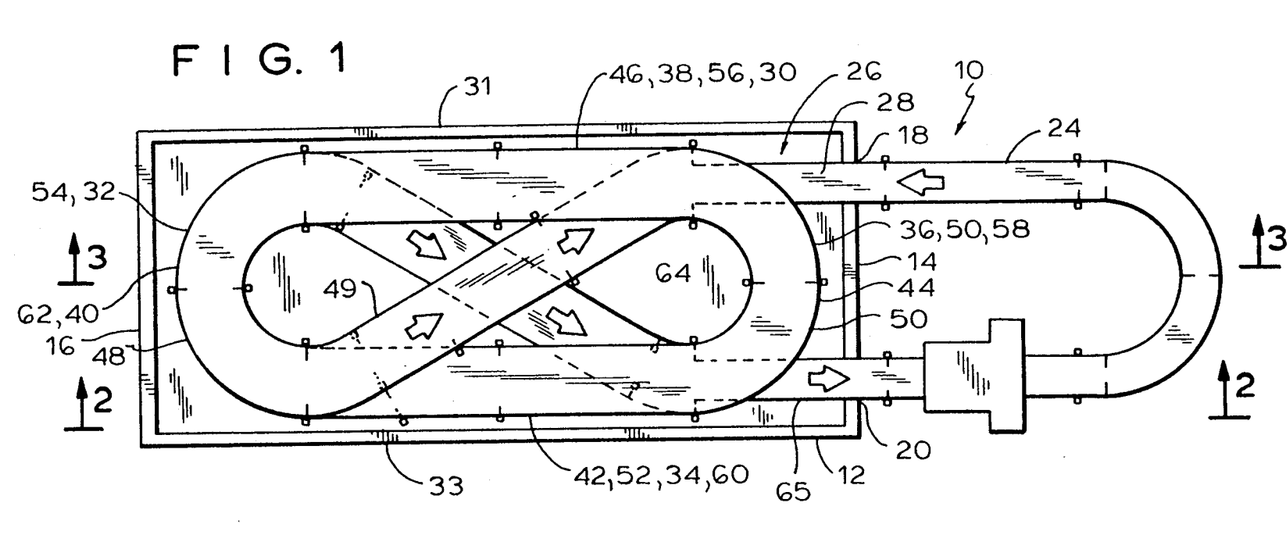
FIG. 1 is a plan view of a conveyor system constructed in accordance with the present invention.
Figure 2:
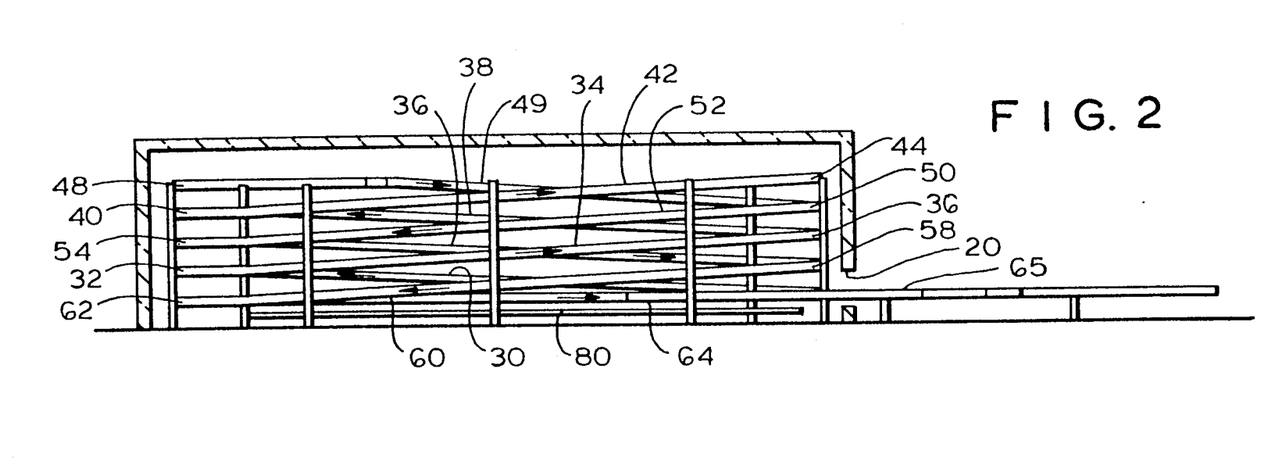
FIG. 2 is a side elevational view, taken along line 2—2 of FIG. 1.
Figure 3:
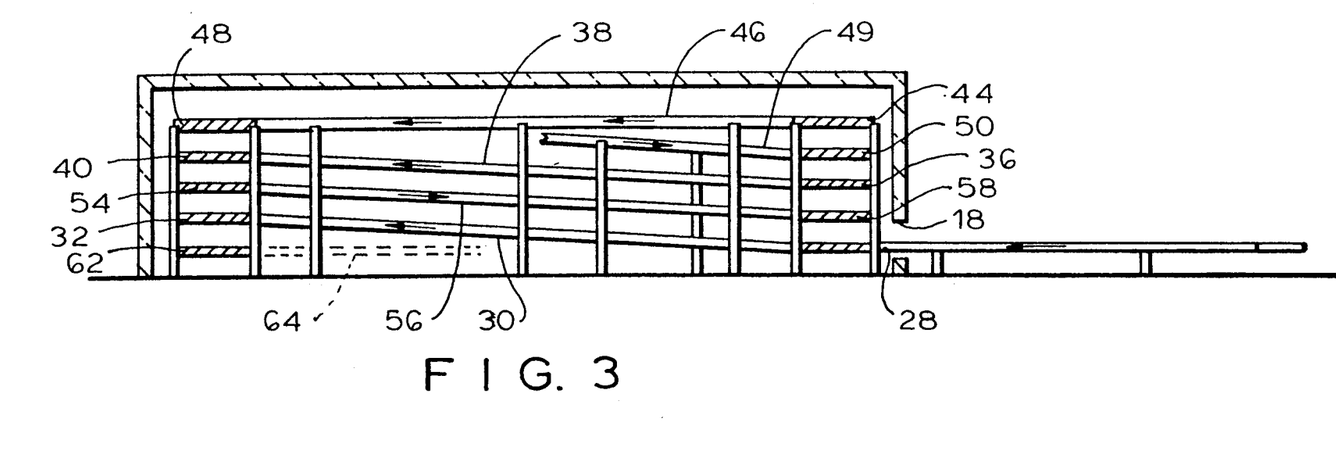
FIG. 3 is a view similar to FIG. 2, but taken along line 3—3 of FIG. 1.
Figure 4:
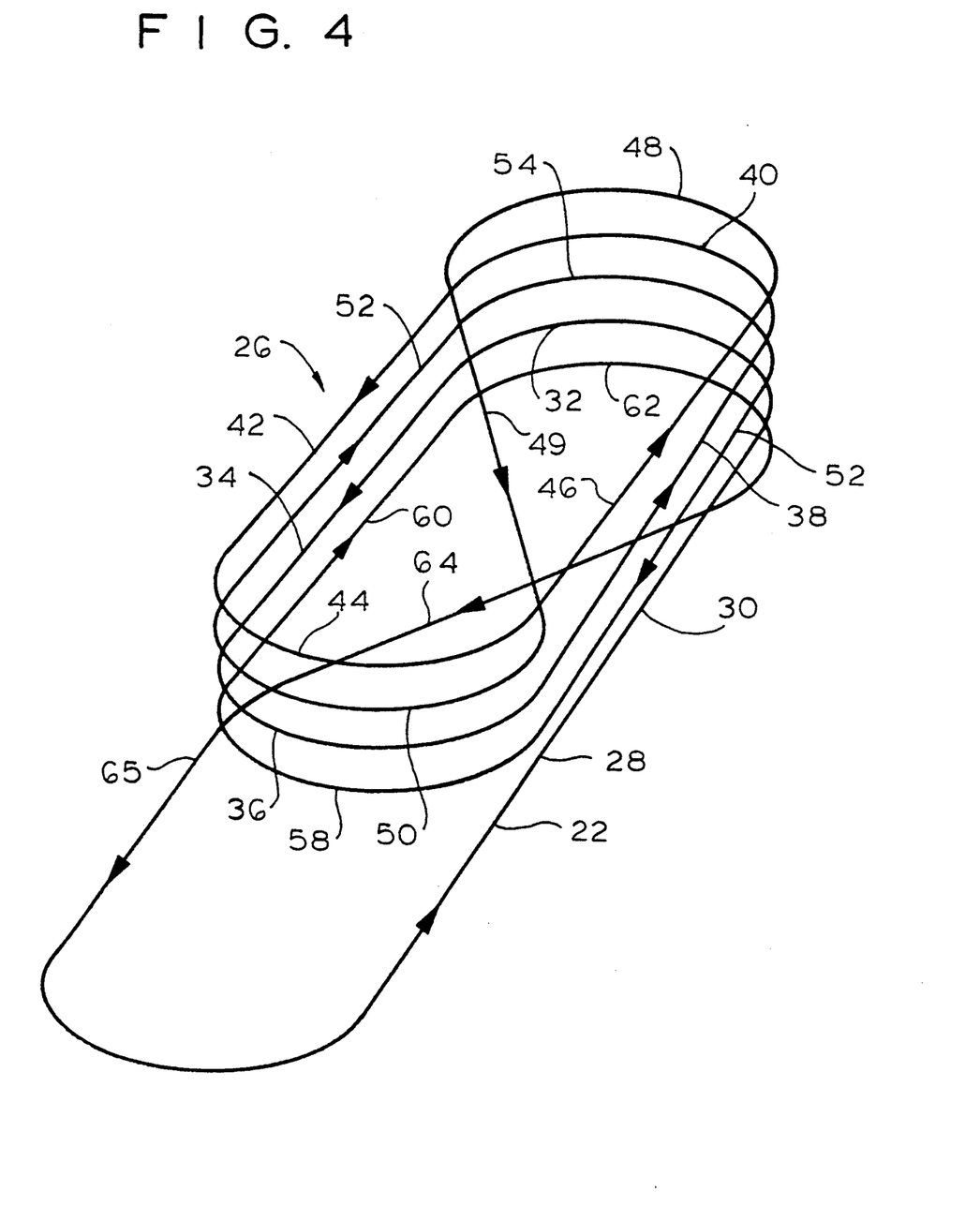
FIG. 4 is a schematic perspective view of the path of travel followed by the conveyor of FIGS. 1-3.

Referring now to the drawings in detail, and initially to FIGS. 1 and 4, a conveyor system 10 constructed in accordance with the present invention is illustrated.

The conveyor system 10 is particularly adapted for use in connection with a bakery oven. The oven 12 used in connection with conveyor 10 is a relatively large rectangular enclosure, of generally conventional construction, as is well known to those skilled in the art. In the illustrated embodiment, the conveyor has opposed end walls 14, 16, with end wall 14 having openings or ports 18, 20 formed therein. The port 18 defines an inlet opening for the conveyor and the port 20 defines an outlet opening.

The conveyor 22 of the present invention may be constructed as a center drive chain conveyor supporting a plurality of wire grids, such as is disclosed, for example, in U.S. Pat. No. 3,680,493. The disclosure of such patent is incorporated herein by reference. The specific construction of the center chain drive conveyor is known in the art and described hereinafter in greater detail.

In particular, conveyor 22 is an endless conveyor constructed generally as described in the '493 patent, which has a first section 24 located outside of the enclosure 12 and a second section 26 located within the enclosure. The first section 24 may follow any convenient path of travel as is necessary within the particular bakery environment in which it is used. This section will include a conveyor take-up, as is conventional in the art, and perhaps a conveyor cleaning unit 25, as well as pan supply and discharge stations, at which pans filled with raw dough are supplied to the conveyor for transport into the oven and at which the pans containing the baked goods are removed from the oven. In addition, as described hereinafter, the drive 27 for the conveyor will be located in this section of the conveyor, outside of the oven.

Conveyor 22 includes an inlet section 28 which passes through the inlet opening 20 into the oven interior. Shortly after entering the oven interior adjacent side wall 31, the conveyor begins to rise in its path of travel, along a straight section 30 toward the opposite end 16 of the oven. At that end the conveyor passes about a first curved section 32 which may be horizontal, or, alternatively, may also have an increasing pitch. After passing through 180°, the conveyor, which is now adjacent side wall 33, enters another straight section 34, which again rises with a continuously increasing pitch of, e.g., 18" per straight run. When straight section 34 approaches end wall 14 it passes through another 180° curved section 36 to a position adjacent side wall 31 and then enters a straight section 38. That straight section is now 36" above straight section 30. Section 38 again rises at a pitch of 18", and as it approaches end wall 16 it enters another 180° curved section 40. After passing again through 180°, it is again adjacent wall 33 and enters another straight section 42, located 36" above section 34. As the conveyor approaches end wall 14 it enters yet another curved section 44. This curved section represents the topmost flight of the conveyor. After passing through this curved section, the conveyor passes through a straight horizontal section 46 which runs along wall 31 to the opposite end 16 of the enclosure where it passes through a curved section 48. After passing through slightly more than 180° in the curved section 48, the conveyor is adjacent side wall 33 and begins to descend along a straight section 49 which crosses to the opposite side 31 of the enclosure until it reaches a position between flight sections 46 and 38 and enters a curved section 50. There the conveyor passes through a 180° curve to side 33 and thence to a straight section 52 located between flight sections 34, 42. During passage through this straight section, the conveyor is descending at a substantially continuous rate of about 18" over the length of the straight section between sections 34, 42 and in an opposite direction. At the end of the straight section 52 the conveyor enters another curved section 54, passes through 180° to a position adjacent side 31 and then to a straight section 56 which is located between flight sections 30, 38. The conveyor continues to move in a decreasing path in an opposite direction to sections 30, 38. Ultimately, the conveyor reaches the curved section 58 where it again passes through 180° and enters a straight section 60 forming the last descending straight section. At the end of the section 60 another 180° curve 62 is present, which leads to a straight horizontal section 64 that crossed over from side 31 to side 33. At side 33 the conveyor enters the discharge section 65 thereof and passes out of the outlet opening 20 in the end wall 14 of the oven enclosure.

Figure 5:
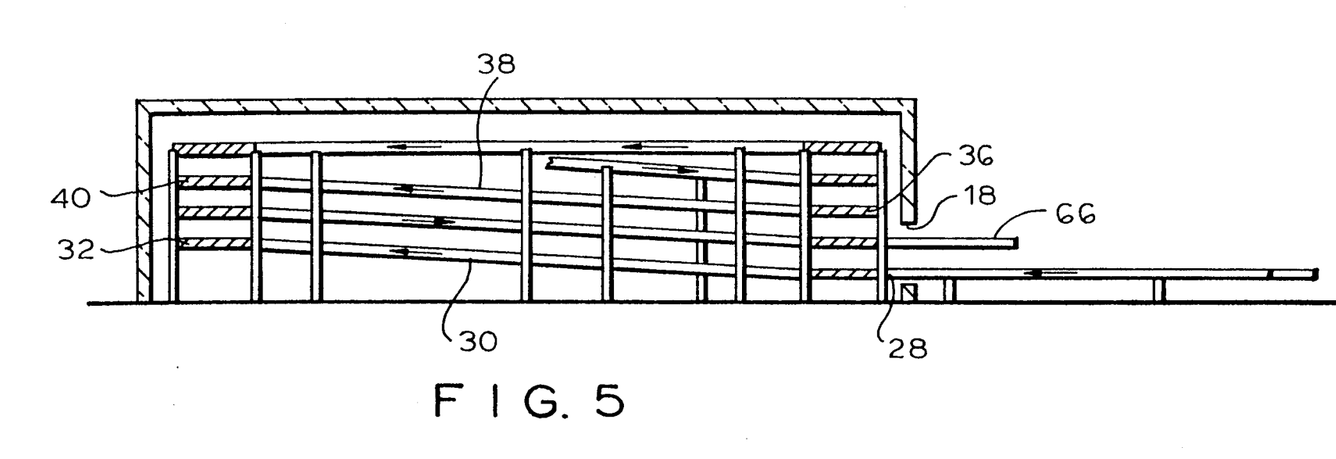
FIG. 5 is a sectional view similar to FIG. 2, illustrating another embodiment of the invention.

In accordance with an aspect of the invention, the conveyor arrangement can be modified so that the inlet and outlets are located at different elevations, whereby the bread pans can enter the oven at substantially any flight or level of the layout, and leave at any level. For example, as illustrated in FIG. 5, instead of having the end curve 58, straight section 60, end curve 62 and straight section 64, the conveyor can be modified such that the inclined section 56 enters a straight section 66 at an elevation immediately above the inlet conveyor section 28, and passes out of an enlarged opening 18 above the inlet conveyor.

Of course, other modifications or variations in the location of the inlet and outlet conveyor sections would be apparent to those skilled in the art. For example, straight section 56 could be made to cross over the oven and exit along wall 33 at the level of curve 58 in FIG. 4.

As a result of this construction, the baking trays are rotated through 180° in relation to the oven walls during their path of travel. Thus, in contradistinction to previously proposed arrangements, such as noted in the above-identified patents, the right side of the baking pans as they enter the conveyor are not always moving adjacent the side walls of the oven enclosure, but are turned during their passage through the oven through 180° so that the left side is also, at times, facing or adjacent the side walls of the oven. This promotes a more uniform bake of the products in the baking trays within the ovens.

The mechanism for supplying heat to the oven can be constructed in any desired manner, such as disclosed for example in U.S. Pat. No. 4,631,029. In the illustrated embodiment, ribbon pipe gas burners 80 are provided which are mounted to extend in the direction of travel under the straight conveyor sections. There can be two burners per straight section with each section or zone having a separate control system, as would be apparent to those skilled in the art. The products of combustion from the oven are withdrawn from the center top of the oven, as described for example in U.S. Pat. Nos. 4,608,961 or 4,631,029.

Figure 6:
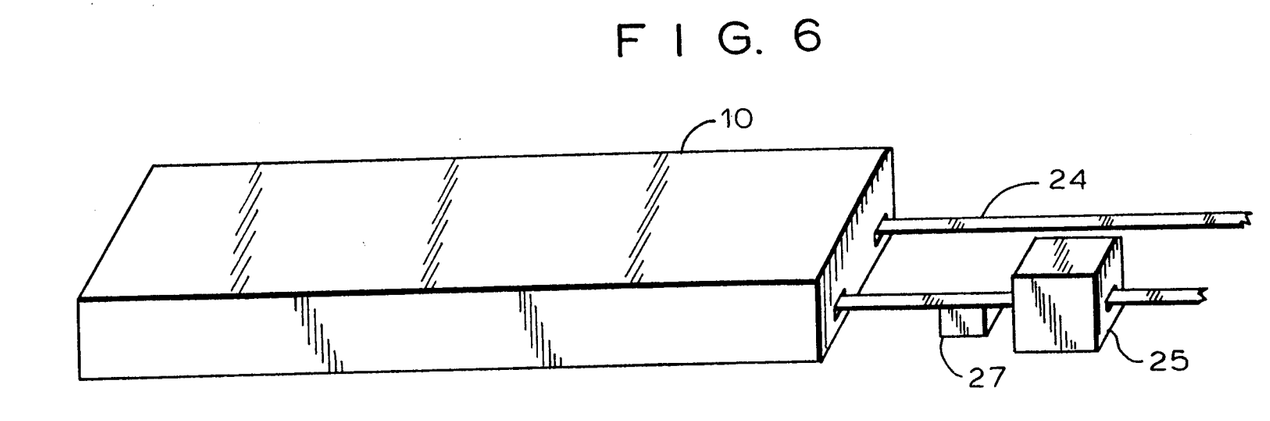
FIG. 6 is a perspective view of an oven constructed according to the present invention showing the location of the conveyor drive and cleaning devices.

FIGS. 6-10 of the drawings illustrate the drive arrangement for the conveyor of the present invention in greater detail. As shown in FIG. 6, the conveyor exits the oven housing 10 to the conveyor section 24 and passes through the drive arrangement 27 and the oven grid burnoff unit 25. The latter unit may be constructed as described in co-pending U.S. patent application Ser.

No. 489,700, filed Mar. 7, 1990, the disclosure of which is incorporated herein by reference.

Figure 7:
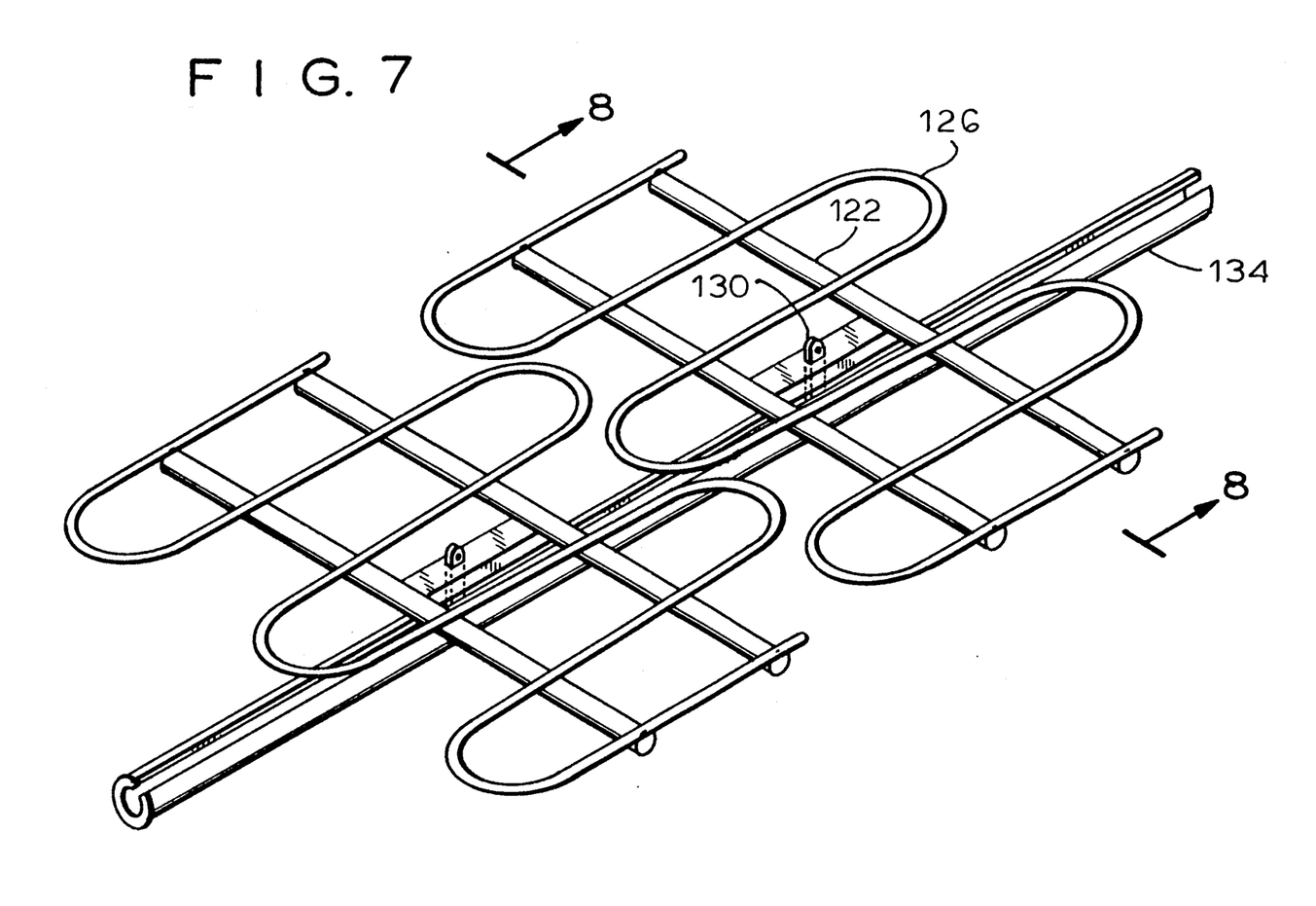
FIG. 7 is a perspective view of a portion of the conveyor of FIG. 1.

The conveyor itself is formed by a series of support grids 122, each of which comprises two transverse bars 124 and a bar or rod 125 which is bent in a zig-zag or sinusoidal shape to provide a number of generally longitudinal bar shaped portions or product support bars 126. Each bar 126 is interconnected to the next bar at its lead end by a U-bend 147 and at its trailing end by a U-bend 127. As a result of this construction, as illustrated in FIG. 7, a continuous support is provided for products resting on the support grids. In addition, individual support grids or racks will move separately around the bends and turns in the conveyor without restrictions which would be present with continuous belt type conveyors.

Figure 8:
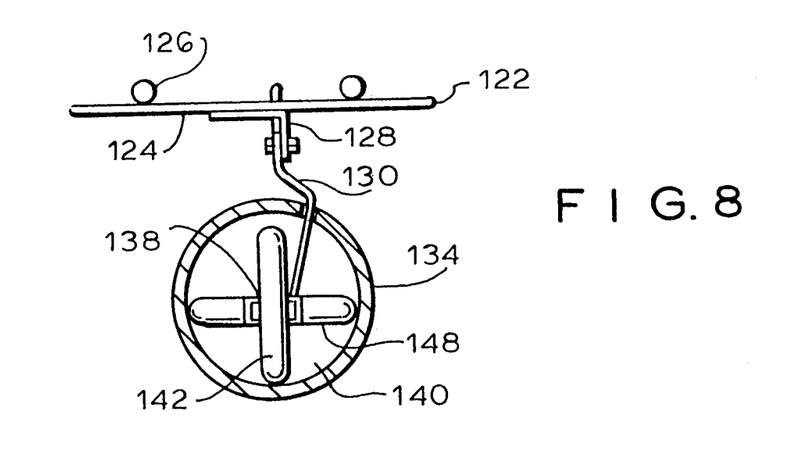
FIG. 8 is a sectional view taken along line 8—8 of FIG. 7.

Each support grid is separately supported by a bracket 128 which is engaged with the transverse bars 124 at the approximate midpoint thereof (see FIG. 8). Each bracket is supported by a conveyor chain and tube assembly 143.

Figure 9:
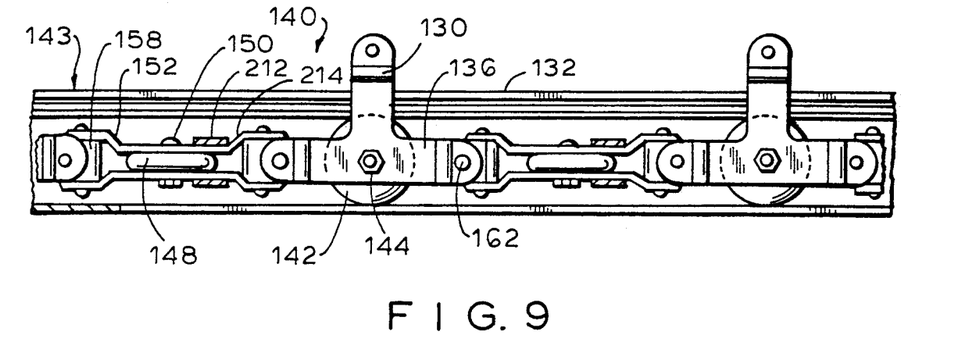
FIG. 9 is a horizontal sectional view of the central chain for the conveyor.

Brackets 128 extend through a slot 132 into a center drive tube 134 (see FIGS. 8 and 9). The vertical brackets 128 are secured in any convenient manner to an interconnecting link 136 of an endless conveyor chain 138 which is enclosed within the tube 134.

The conveyor chain 138 is formed by a series of interconnecting units 140 and 146 which are similar to each other. Each unit 140 has a roller 142 with a horizontal shaft 144 and each unit 146 has a roller 148 with a vertical shaft 150. Each unit 146 also has a pair of identical links 152 and at each end of the unit the ends 154 of links 152 are connected by a pivot 156 to a connector 158. Each of units 140 is similarly constructed, with its links 136 and a mating link 160 which is identical to the links 152. Each end of each pair of links 136, 160 is also connected to a pivot pin 162 to the adjacent connector 158 so as to provide a universal joint connection between each end of each of the units 140 and the next adjacent unit 146. The central portions of links 152 are spaced relatively close together so as to provide side plates for the roller between them, while the ends of the links are spaced apart to provide an enlarged interconnecting pivot. Links 136 and 160 are similarly constructed.

The units 140 and 146 form an endless conveyor which moves within the tube 134 and can follow and turn with the contour of the tube. Rollers 142 provide vertical support and rollers 148 provide horizontal clearance. Also, each of the support grids 122 is rigidly mounted upon its unit 140 so that it is moved by the conveyor chain 138 and the conveyor chain provides support.

Figure 10:
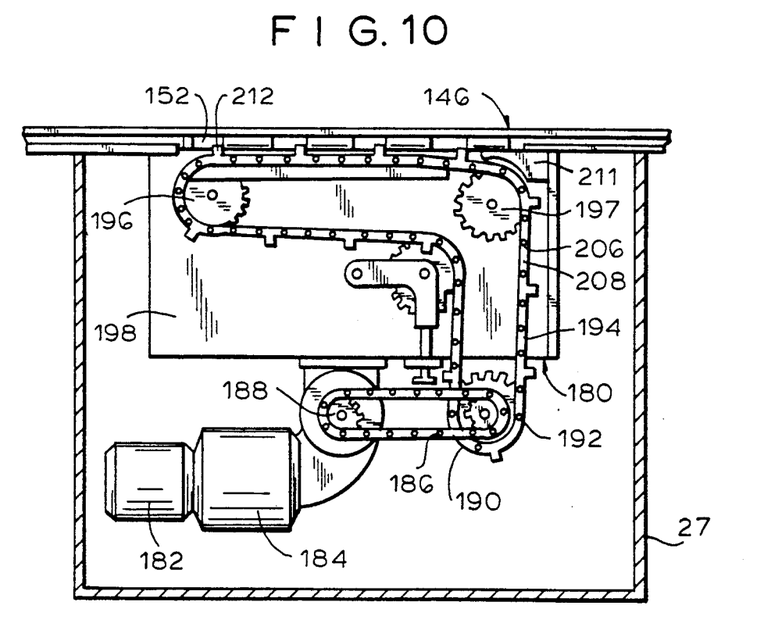
FIG. 10 is a side view of one of the driving units for the conveyor.

The conveyor constructed in accordance with the present invention is driven by one or more drive units 27, one of which is illustrated in FIG. 10. As mentioned above, these drive units 27 are located in the section of the conveyor which is outside of the oven.

Each drive unit 27 includes an electric motor 182, an adjustable speed gear reduction assembly 184, a driving chain 186 which extends between cog wheels 188 and 190, a cog wheel 192 which is fixed to cog wheel 190, a driving chain 194, and three cog wheels 195, 196 and 197 which are mounted upon a mounting plate 198. Cog wheel 195 is swingably mounted upon a pivot 199 by a pair of brackets 200, and an adjusting screw bolt 202 is provided to adjust the tension on driving chain 194. That is, bolt 202 is threaded in a bracket 204 and when it is turned clockwise, it swings brackets 200 and cog wheel 195 counterclockwise about pivot 199 so as to tighten the drive chain.

Drive chain 194 includes spaced driving lugs 212 which are so spaced as to project directly above and below the center portions of the links 152 of the center drive chain. As shown in FIG. 10, when one of the driving links 200 passes around the cog wheel 196, it moves in behind the ends of a pair of links 152 and the driving lugs 212 ride against the shoulders 214 formed by the spaced ends of the links. Hence, the driving movement is transmitted uniformly to the conveyor chain in an efficient and dependable manner. This driving arrangement is described in greater detail in U.S. Pat. No. 3,680,493, as mentioned above.

By the construction of the present invention using this conveyor system, the hot and humid air within the oven enclosure can pass freely around the conveyor and through the conveyor support grids, to uniformly and evenly heat the bakery products in the oven. This, combined with the reversal of the relative position of the bakery products in the oven due to the configuration of the conveyor's path of travel results in an improved and highly uniformly baked product. In addition, the center drive chain arrangement of the invention permits the drive units for the oven to be located outside of the oven. In that position, the drive units are protected against the hostile environment contained within the oven enclosure so that they will have a longer useful life. Moreover, should a drive unit become damaged or require repair, it is easily accessible by workmen outside of the oven itself. Thus, the repair personnel are not required to work within the hostile oven environment in order to make necessary repairs.

Although preferred embodiments of the invention have been described in connection with the accompanying drawings, it would be understood by those skilled in the art that various modifications and changes can be effected therein without departing from the scope or spirit of this invention.

What is claimed is:

1. A baking apparatus, comprising means forming an oven enclosure having opposed end portions and opposed sides; a conveyor for food products adapted to convey such products into and out of said enclosure at a controlled rate of speed along a path of travel, said enclosure having conveyor inlet and outlet openings formed in at least one of said end portions at predetermined elevations therein; said conveyor comprising an endless conveyor having an endless center drive chain, a first straight inlet section which passes through said conveyor inlet opening, a riser section following a generally spiral shaped path of travel through a plurality of levels of increasing elevation to a predetermined level adjacent one side of the enclosure, a second straight section extending from said predetermined level at said one side of the enclosure in a generally straight declining path of travel to a predetermined elevation and position between levels of the riser section of the conveyor on the opposite side of the enclosure, a declining section located between the levels of said riser section and extending from said predetermined position to a lower position in the enclosure while generally continuously decreasing in elevation, and a final straight section leading from said declining section to said conveyor outlet opening of the enclosure whereby the position of pans on the conveyor relative to the side of the conveyor are reversed during travel in the riser and declining sections of the conveyor; means for supplying heat to said enclosure for baking products in said oven; and means located outside of said enclosure for driving said center chain conveyor through its path of travel in the enclosure.

2. An apparatus as defined in claim 1, wherein said inlet and outlet openings are located on the same end of the enclosure.

3. An apparatus as defined in claim 2, wherein said inlet and outlet openings are located at the same predetermined elevation.

4. An apparatus as defined in claim 1, wherein said outlet opening is located at a lower elevation than said inlet opening.

5. An apparatus as defined in claim 4, wherein said outlet opening is located below said inlet opening.

6. An apparatus as defined in claim 3, wherein the conveyor includes a lower crossing section extending between said lower position of the declining section and said final straight section at a position adjacent said opposite side of the enclosure to said one side, thereby to complete a generally S-shaped path of travel.

7. An apparatus as defined in claim 1 wherein said conveyor includes a plurality of generally vertically positioned brackets and product support grids mounted on said brackets.

8. An apparatus as defined in claim 7 wherein said support grids include generally sinusoidally shaped bar members cooperating to define a generally continuous product support surface.

9. An apparatus as defined in claim 7 wherein said conveyor includes a support tube mounted in the enclosure following the path of travel of the conveyor therein, said tube having a longitudinal slot formed therein and said chain being mounted in the slot.

10. A baking oven, comprising a food conditioning enclosure having opposed end and side portions and conveyor inlet and outlet openings formed therein, an endless conveyor including an endless center drive chain, a first conveyor section located outside of the enclosure and having portions passing through said inlet and outlet openings, and a second, main conveyor portion located within said enclosure, said second, main conveyor portion including a first sequential set of flights having a generally continuously increasing elevation rising in the enclosure to a predetermined elevation, a second set of flights having a generally continuously decreasing elevation in the enclosure, with the flights of said second set being located between the flights of said first set, and a straight conveyor section connecting said first and second sets of flights at the uppermost elevations of said first and second sets of flights and crossing from one side of the enclosure to the other; means for supplying heat to said enclosure for baking products in said oven, and means located outside of said enclosure for driving said center chain conveyor through its path of travel in the enclosure.

11. A food processing apparatus as defined in claim 10, wherein said second set of flights includes a straight terminal end portion extending through said outlet opening to the first section of the conveyor.

12. Apparatus as defined in claim 11, wherein said inlet and outlet openings are located on the same end of the enclosure.

13. Apparatus as defined in claim 11, wherein said inlet and outlet openings are located at the same predetermined elevation.

14. Apparatus as defined in claim 11, wherein said outlet opening is located at a lower elevation than said inlet opening.

15. Apparatus as defined in claim 14, wherein said outlet opening is located below said inlet opening.

16. Apparatus as defined in claim 10, wherein the flights of said first and second sets have curved portions adjacent the ends portions of the enclosure, and straight portions between said curves located along said side portions of the enclosure, said curved portions being horizontal and said straight portions of the flight being inclined.

17. An apparatus as defined in claim 16 wherein said conveyor includes a plurality of generally vertically positioned brackets and product support grids mounted on said brackets.

18. An apparatus as defined in claim 17 wherein said support grids include generally sinusoidally shaped bar members cooperating to define a generally continuous product support surface.

19. An apparatus as defined in claim 16 wherein said conveyor includes a support tube mounted in the enclosure following the path of travel of the conveyor therein, said tube having a longitudinal slot formed therein and said chain being mounted in the slot.

* * * * *